United States Patent [19]

Jurewicz et al.

[11] Patent Number: 5,172,560

[45] Date of Patent: Dec. 22, 1992

[54] METHOD OF OPERATING A TRANSPORT REFRIGERATION SYSTEM

[75] Inventors: Romuald M. Jurewicz, St. Louis Park; Jay L. Hanson; Jeffrey B. Berge, both of Bloomington; Jayaram Seshadri, Minneapolis; Alan D. Gustafson, Eden Prairie; David A. Christiansen, Bloomington, all of Minn.; Richard A. Johnson, Murrysville Boro, Westmoreland Co., Pa.; Lowell B. Naley, Minnetonka; Doyle G. Herrig, Elko, both of Minn.

[73] Assignee: Thermo King Corporation, Minneapolis, Minn.

[21] Appl. No.: 858,806

[22] Filed: Mar. 27, 1992

[51] Int. Cl.⁵ .................................. F25D 19/06
[52] U.S. Cl. .......................... 62/89; 62/160; 62/229; 236/91 F
[58] Field of Search .............. 62/89, 160, 209, 229, 62/324.6; 236/78 D, 91 F

[56] References Cited

U.S. PATENT DOCUMENTS 3,665,725  5/1972  Barless et al. ................. 62/196
4,742,689  5/1988  Lowes ............................ 62/197
4,789,025  12/1988  Brandemuehl et al. ......... 165/30
4,899,549  2/1990  Berge et al. .................... 62/160
4,918,932  4/1990  Gustafson et al. .............. 62/89

Primary Examiner—William E. Tapolcai
Attorney, Agent, or Firm—D. R. Lackey

[57] ABSTRACT

A method of operating a transport refrigeration system having a compressor driven by a prime mover at a selected one of high and low speeds, an evaporator, and an evaporator blower driven by the prime mover. Refrigeration control provides an error value which controls the temperature of a load space to a predetermined set point via heating and cooling modes. The method includes the steps of driving the compressor at high speed during pull down, and injecting hot gas into the evaporator when the error is reduced to a predetermined value. The prime mover is maintained at high speed, to keep evaporator air flow at a high rate, continuing a relatively rapid temperature pull-down across the entire load space. The speed of the prime mover is reduced to low speed when the error is further reduced to a second value, which also initiates suction line modulation while maintaining hot gas injection.

8 Claims, 3 Drawing Sheets

METHOD OF OPERATING A TRANSPORT REFRIGERATION SYSTEM

TECHNICAL FIELD

The invention relates in general to transport refrigeration systems, and more specifically to a method of operating a transport refrigeration system of the type in which the speed of the evaporator blower is a function of compressor prime mover speed.

BACKGROUND ART

Transport refrigeration systems for trailers maintain a desired set point for a perishable load by continuously cycling between cooling and hot gas heating modes. A Diesel engine is normally used for the compressor prime mover, with some trailer units also having an electric stand-by motor for driving the compressor when the trailer is parked near a source of electric potential. Evaporator and condenser fans or blowers are driven by the operative prime mover, such as via pulleys and associated belts linked to the drive shaft of the operative prime mover.

The Diesel engine used for the compressor prime mover is conventionally operated at a selected one of two speeds, called high and low speed, such as 2200 RPM and 1400 RPM, respectively. A Diesel engine has ample driving power for a transport refrigeration system, and is usually operated at high speed only during the initial temperature pull down, as it is desirable to rapidly bring the temperature of the served trailer space to a predetermined temperature above the selected set point temperature, at which point the engine speed is reduced to low speed. The Diesel engine will then usually operate at low speed during the ensuing cycling back and forth between cooling and heating modes, reverting to high speed to hold set point only during cooling and heating modes associated with very high and very low ambient temperatures, respectively.

Thermal capacity, even with prior art systems which include compressor unloading, is such that with continuously operated compressors, the temperature difference between the entrance and exit air from the evaporator is relatively high, removing considerable moisture from the conditioned air via condensation on the evaporator coils. To preserve a perishable load with a goal of long shelf life, it is usually desirable to remove as little moisture from the product as possible, while holding the load temperature as close to the selected set point temperature as possible, avoiding downward temperature swings which may damage the product by freezing, as well as upward temperature swings which raise the average temperature and lessen shelf life. To lessen moisture removal, a transport refrigeration system for a trailer is operated in high speed for as short a time as possible during temperature pull down. However, dropping to low speed greatly reduces the rate of conditioned air flow produced by the evaporator blower or blowers, making it difficult to obtain uniformity of load temperature during temperature pull down, especially at the back of a long trailer.

Thus, it would be desirable, and it is an object of the present invention, to be able to rapidly and uniformly bring the temperature of a perishable load to set point, without temperature swings which may damage the product by freezing or shortening shelf life.

SUMMARY OF THE INVENTION

Briefly, the present invention is a method of operating a transport refrigeration system having a compressor driven by a prime mover at a selected one of predetermined high and low speed values. The refrigeration system further includes hot gas, liquid and suction lines, a condenser, an evaporator, and expansion means in the liquid line. A controllable modulation valve is provided in the suction line, and a controllable hot gas injection valve is disposed between the hot gas line and evaporator. Evaporator air flow means, such as a blower or fan, is driven by the compressor prime mover, and refrigeration control means provides a control error for controlling the temperature of an associated load space to a predetermined set point via heating and cooling modes which includes modulation control of the suction line modulation valve.

The method includes the steps of driving the compressor at the predetermined high speed value during a cooling mode when the control error exceeds a first predetermined value, injecting hot gas into the evaporator via the hot gas injection valve when the control error is reduced to the first predetermined value, while maintaining the prime mover at the predetermined high speed. This maintains the evaporator air flow at a high rate associated with high prime mover speed, to provide relative rapid and uniform temperature pull-down across the entire load space, notwithstanding that cooling capacity has been reduced by the hot gas injection. Thus, the temperature drop across the evaporator coil is reduced, to reduce moisture removal from the conditioned load, while air flow rate is maintained at the maximum value for distributing the conditioned air across the trailer length.

The method continues by reducing the prime mover speed to the predetermined low speed value only when the control error has been further reduced to a second predetermined value. At the second predetermined value, suction line modulation is initiated, while maintaining hot gas injection. This allows set point to be approached without excess refrigeration capacity, which would otherwise introduce a step change in the control algorithm, causing instability and loss of control.

If a mode change is required to hold set point, the method includes the step of switching from the cool mode to the heat mode, when the control error has been further reduced to a third predetermined value, such as zero error, while maintaining suction line modulation and terminating hot gas injection.

The hot gas injection during a cool mode necessitates a small flow of refrigerant through the suction line at and near a control error value of zero, either enabling set point to be held without a mode change, or causing the refrigeration capacity just prior to a mode change to more closely match the capacity available after a mode change, enabling substantially continuous and more stable control over the load space temperature through a mode change.

BRIEF DESCRIPTION OF THE DRAWING

The invention will become more apparent by reading the following detailed description in conjunction with the drawings, which are shown by way of example only, wherein.

DESCRIPTION OF PREFERRED EMBODIMENTS

For purposes of example, the refrigeration system shown in U.S Pat. No. 4,899,549 has been modified that it will operate according to the method of the invention, and the modified refrigeration system is set forth in FIG. 1. A control error for controlling the refrigeration of FIG. 1 may be developed according to the teachings of U.S. Pat. No. 4,918,932. These patents, which are both assigned to the same assignee as the present application, are hereby incorporated into the specification of the present application by reference.

Figure 1:
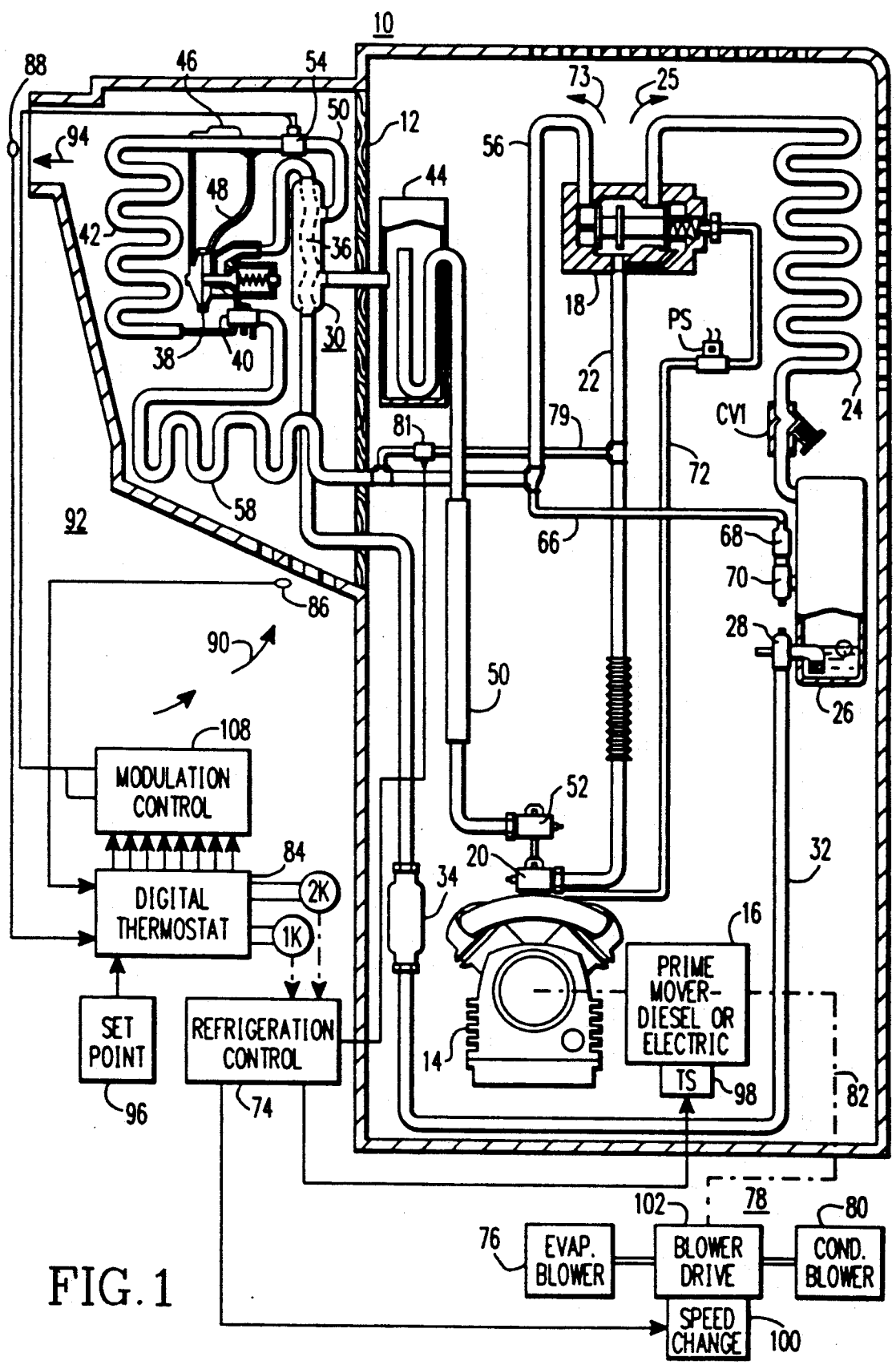
FIG. 1 is a partially schematic and partially block diagram of a transport refrigeration system which may be operated according to the method of the invention.

Referring now to the drawings, and to FIG. 1 in particular, there is shown a transport refrigeration system 10 which may be operated according to the method teachings of the invention. Refrigeration system 10 is mounted on a wall 12 of a served space to be conditioned, such as a truck, trailer, or container. Refrigeration system 10 includes a closed fluid refrigerant circuit which includes a refrigerant oompressor 14 driven by a prime mover, such as an internal combustion engine, e.g., a Diesel engine, and/or an electric motor, indicated generally at 16.

Discharge ports of compressor 14 are connected to an inlet port of three-way valve 18 via a discharge service valve 20 and a hot gas conduit or line 22. The functions of three-way valve 18, which has two output ports selectively operable for cooling and heating mode operation, may be provided by two separate valves, if desired. The cooling mode output port of three-way valve 18 is connected to the inlet side of a condenser coil 24, to initiate a first refrigerant circuit 25. The outlet side of condenser coil 24 is connected to the inlet side of a refrigerant receiver tank 26 via a condenser check valve CV1, which enables fluid flow only from condenser coil 24 to receiver tank 26. An outlet valve 28 on receiver tank 26 is connected to a heat exchanger 30 via a liquid line 32 which may include a drier or dehydrator 34.

Liquid refrigerant from liquid line 32 continues through a coil 36 of heat exchanger 30 to expansion means 38, such as the expansion valve illustrated. Expansion valve 38 is controlled by an expansion valve thermal bulb 46 and a pressure equalizer line 48. The outlet of expansion valve 38 is connected to a refrigerant distributor 40 which distributes refrigerant to the inlets of a plurality of refrigerant circuits on the inlet side of an evaporator coil 42. The outlet side of evaporator coil 42, which initiates the low pressure or suction side of the refrigeration circuit 25, is connected to the suction side of compressor 14.

The suction or low pressure side of refrigeration system 10 includes a suction line 50, with the suction line 50 including a controllable suction line modulation valve 54, another path through heat exchanger 30, and preferably an accumulator tank 44. Gaseous refrigerant in accumulator tank 44 is directed from the outlet side thereof to a suction port of compressor 14 via another section of suction line 50, and a suction line service valve 52. As illustrated, modulation valve 54 is preferably located in a portion of suction line 50 which is adjacent to the outlet of evaporator 42 and prior to heat exchanger 30 and accumulator 44, in order to protect compressor 14 by utilizing the volumes of these devices to accommodate any liquid refrigerant surges which may occur while modulation valve 54 is being controlled.

The heating mode output port of three-way valve 18 is connected to a hot gas line 56 which extends from three-way valve 18 to the refrigerant distributor 40 and thus the inlet side of evaporator coil 42, via a defrost pan heater 58 located below evaporator coil 42. A by-pass conduit or pressurizing tap 66 may extend from hot gas line 56 to receiver tank 26 via by-pass and service check valves 68 and 70, respectively, in order to force refrigerant from receiver 26 during a heat mode, such as used to hold set point or to defrost evaporator coil 42.

A conduit 72 connects three-way valve 18 to the intake side of compressor 14 via a normally closed pilot solenoid valve PS. When solenoid operated valve PS is closed, three-way valve 18 is spring biased to the cooling mode position, to direct hot, high pressure refrigerant vapor into the first refrigerant circuit 25 which includes condenser 24. Condenser 24 removes heat from the vapor and condenses it to a lower pressure liquid. When evaporator 42 requires defrosting, and also when a heating mode is required to hold the selected thermostat set point of the load being conditioned, pilot solenoid valve PS is opened via voltage provided by a refrigeration control function 74. Three-way valve 18 is then operated to its heating mode position, via low side pressure, which directs refrigerant in the form of hot, high pressure vapor to the evaporator coil 42 via hot gas line 56, defrost pan heater 58, and distributor 40, by-passing expansion valve 38. If the heating mode is initiated in response to a defrost requirement, no air is discharged into an associated served space, indicated generally at 92, during the defrost time. During a heating cycle required to hold a thermostat set point temperature, and during a cooling mode, an evaporator fan or blower 76, which is driven by prime mover 16, directs conditioned air into the served space 92. Evaporator blower 76 is part of air delivery means 78, which also includes a condenser fan or blower 80. Air delivery means 78 is driven by prime mover 16, such as by a pulley and belt arrangement indicated generally by broken line 82.

The refrigeration system of the incorporated U.S. Pat. No. 4,899,549 is modified by connecting a hot gas by-pass line 79 between hot gas line 22 and the inlet side of evaporator 42, such as by connecting line 79 to the defrost pan heater 58. A solenoid operated valve 81 is disposed in by-pass line 79. While valve 81 may be a controllable modulation type valve, a simple on-off solenoid valve is sufficient to perform the method of the invention. The size of by-pass line 79 is selected to provide the desired amount of hot gas injection into evaporator 42 when valve 81 is operated to its open position.

Refrigeration control 74 includes a thermostat 84 having temperature sensors 86 and 88. Temperature sensor 86 is disposed to detect the temperature of the air returning to the evaporator blower 76 from the served space 92, e.g., the space within a truck, trailer, or container, with the return air being indicated by arrow 90. Temperature sensor 88 is disposed to detect the temperature of conditioned air being discharged by the evaporator blower 76 through the evaporator 42 and back into the served space 96, with the discharge air being indicated by arrow 94.

Thermostat 84 includes set point selector means 96 for selecting a desired set point temperature to which system 10 will control the temperature of the return air 90. As illustrated, thermostat B4 also provides output signals for use by a modulation controller 108, which controls the opening and closing of suction line modulation valve 54.

Signals provided by thermostat 84 control heat and speed relays 1K and 2K, respectively, which have contacts in refrigeration control 74, such as illustrated in U.S. Pat. Nos. 4,712,383; 4,419,866; and 4,325,224, which are assigned to the same assignee as the present application. Heat relay 1K is de-energized when system 10 should be in a cooling mode, and it is energized when system 10 should be in a heating or defrost mode. Speed relay 2K is de-energized when system 10 should be operating prime mover at low speed, e.g., 1400 RPM, and it is energized when prime mover 16 should be operating at high speed, e.g., 2200 RPM. Contacts of heat relay 1K, for example, are connected in refrigeration control 74 to de-energize and energize pilot solenoid valve PS, to select cooling and heating modes, respectively. Contacts of speed relay 2K, for example, are connected in refrigeration control 74 to de-energize and energize a throttle solenoid 98 associated with prime mover 16, for selecting the low and high speeds, respectively.

The function of thermostat 84 and modulation controller 108 may be performed by a computer, such as disclosed in U.S. Pat. No. 4,663,725, and in the hereinbefore mentioned U.S. Pat. No. 4,918,932. Analog or digital thermostats may be used for the thermostat function 84, with suitable digital thermostats which may be used being shown in U.S. Pat. Nos. 4,819,441 and 4,903,498, all of which are assigned to the same assignee as the present application.

The refrigeration control 74 provides a control error in response to a predetermined relationship between the set point temperature selected by set point selector 96, and the temperature of the served space 92 as indicated by sensors 86 and 88. The control error may simply be a straight proportional function of the difference between the selected set point temperature and the temperature detected by one of the sensors, such as the return air sensor 86, or the difference between set point and the average value of the two sensors. In a preferred embodiment, control 74 includes a digital computer and the control error is calculated, using the values provided by both sensors 86 and 88. For example, the control error may be calculated as disclosed in the hereinbefore mentioned U.S. Pat. No. 4,918,932, which sums three different calculations, a proportional error, an integral error and a floor error, to provide a control error which controls refrigeration system 10 according to the difference of the control error from the selected set point temperature.

Control of the desired coil current of suction line modulation valve 54 to obtain the desired valve position at predetermined control error values may be by computer in response to the calculated control error value at any instant. For example, the control error value may be used to address look-up tables stored in computer memory to obtain digital output signals which turn on or off predetermined switches in a matrix of resistors. The resistors are combined in different parallel combinations to provide the desired resistance in an electrical circuit which includes the control coil of modulation valve 54. Or, a digital signal may be provided by thermostat 84 which controls modulation control 108 having such a resistive network, as disclosed in the hereinbefore mentioned U.S. Pat. No. 4,899,549.

Figure 2:
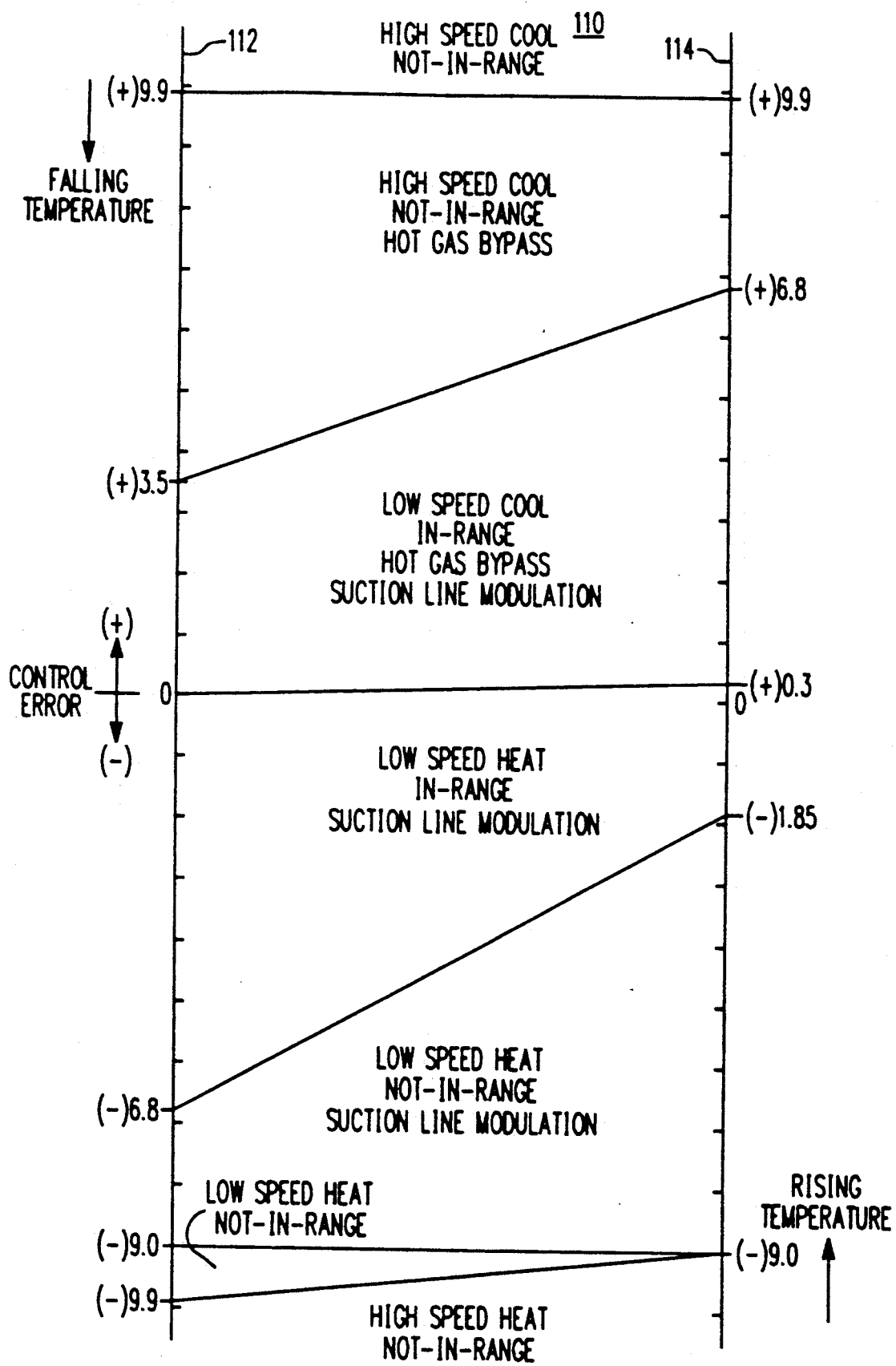
FIG. 2 is a control algorithm which sets forth the method steps of the invention.

FIG. 2 is a control algorithm 110 which sets forth the teachings of the invention, with various exemplary control error values utilized during falling and rising temperatures in served space 92 being illustrated along the left and right hand sides, respectively, of control algorithm 110. The control functions performed upon reaching the exemplary control error values are set forth within the outlined areas between the left and right hand vertical boundary lines 112 and 114, respectively.

During initial temperature pull down, refrigeration system 10 is operated in a high speed, not-in-range cooling mode, during which prime mover 16 is operated at high speed, e.g., 2200 RPM. During this high speed cool, not-in-range operating mode, suction line modulation valve 54 is wide open and hot gas injection valve 81 is closed. When the control error is reduced to a first predetermined value, e.g., +9.9 degrees F., hot gas injection valve 81 is opened by an appropriate signal from refrigeration control 74, to initiate a staged reduction in cooling capacity by by-passing a predetermined portion of the hot gas being discharged by compressor 14 around condenser 24, receiver 26, and expansion valve 38, and into evaporator 42, such as by injecting the hot gas into the defrost pan heater 58. This starts to reduce the temperature drop across evaporator coil 42, to reduce the moisture being removed from the load being conditioned in space 92. System 10 remains in the high speed cooling mode, however, retaining the high rate of evaporator air flow associated with high prime mover speed, which insures that temperature pull down will continue uniformly from the front to the rear of the served space 92. This eliminates the need for costly speed changers which are sometimes utilized to maintain high air flow when the prime mover speed drops to reduce cooling capacity. The high speed mode is continued to a point much closer to the set point temperature than in the prior art, without danger of freezing the conditioned load, utilizing a relatively low second predetermined control error, such as +3.5 degrees F., for example, before switching prime mover 16 to low speed. When prime mover 16 is switched to low speed, e.g., 1400 RPM, the hot gas by-pass is maintained by keeping valve 81 open, and suction line modulation is initiated by starting a controlled opening of modulation valve 54 in response to a falling control error value. Dropping the speed of prime mover 16 and compressor 14 further reduces cooling capacity, and the resulting cooling capacity is further reduced as suction line modulation valve control 108 progressively closes modulation valve 54 as the control error approaches zero. Suction line modulation valve 54 will not be completely closed as the control error approaches zero, as some refrigerant flow will be necessary to offset the heat capacity being provided by hot gas injection. Thus, in most cases the temperature of served space 92 may be held very close to the selected set point temperature without a mode change, and without deleterious upward or downward swings in temperature.

In certain ambient conditions, i.e., during a low ambient temperature, a mode change from cool to heat may be necessary to hold the selected set point temperature, with pilot solenoid valve PS being opened to actuate three-way valve 18 in the event the control error value drops to a third predetermined error value, e.g., the changing of the control error from positive to negative. The very low capacity existing in refrigeration system 10 at the time of such a mode change, enables the capacity during the cooling mode to closely match the initial capacity available during a heating mode, and thus the mode change is made without a step change in capacity. Switching from a cooling to a heating mode with an undesirable step change in available capacity would introduce instability and loss of control into the control algorithm at a time when the load temperature may be close to freezing, which may result in damage to the served load. The disclosed method prevents such loss of control, and thus the invention greatly reduces the chance of load damage.

When system 10 changes from the cooling mode to the heating mode, hot gas injection may be terminated by closing valve 81, as three-way valve 18 is now diverting all of the hot gaseous refrigerant directly to evaporator 42 anyway, making it unnecessary to hold by-pass line 79 open. Suction line modulation, however, is continued, with suction line valve 54 now being progressively opened as a function of an increasing magnitude of negative control error.

If the temperature of the served space should continue to fall and reach a fourth predetermined control error, such as ($-$)9.0, for example, suction line modulation is terminated. If the control error continues to increase in the negative direction and reaches a fifth predetermined control error, such as ($-$)9.9, for example, the prime mover is switched to high speed to further increase the heating capacity.

With a rising temperature in the served space 92, suction line modulation is resumed, and the prime mover speed dropped to low speed at a predetermined control error value, such as upon reaching the fourth predetermined control error ($-$)9.0. System 10 stays in low speed heat, with suction line modulation until reaching the third predetermined control error plus a small hysteresis, such as +0.3 degrees F. At this point, the pilot solenoid valve PS is de-energized to switch from the heat mode to the cool mode, the hot gas by-pass is initiated by opening solenoid valve 81, and suction line modulation is continued. With a rising temperature, from ($-$)9.0 to +0.3 control error, modulation valve 54 is progressively closed, and when the mode changes from heating to cooling, valve 54 is progressively opened with a continued rise in temperature of served space 92. Modulation is preferably continued with a rising temperature to a much higher control error value than the initiation of suction line modulation with a falling temperature, such as by continuing suction line modulation until the control error increases to +6.8. If the control error rises above +6.8, suction line modulation is terminated, the speed of prime mover 16 is increased to high speed, and hot gas injection is maintained, at least until the control error rises above the first predetermined control error value of +9.9.

Figure 3:
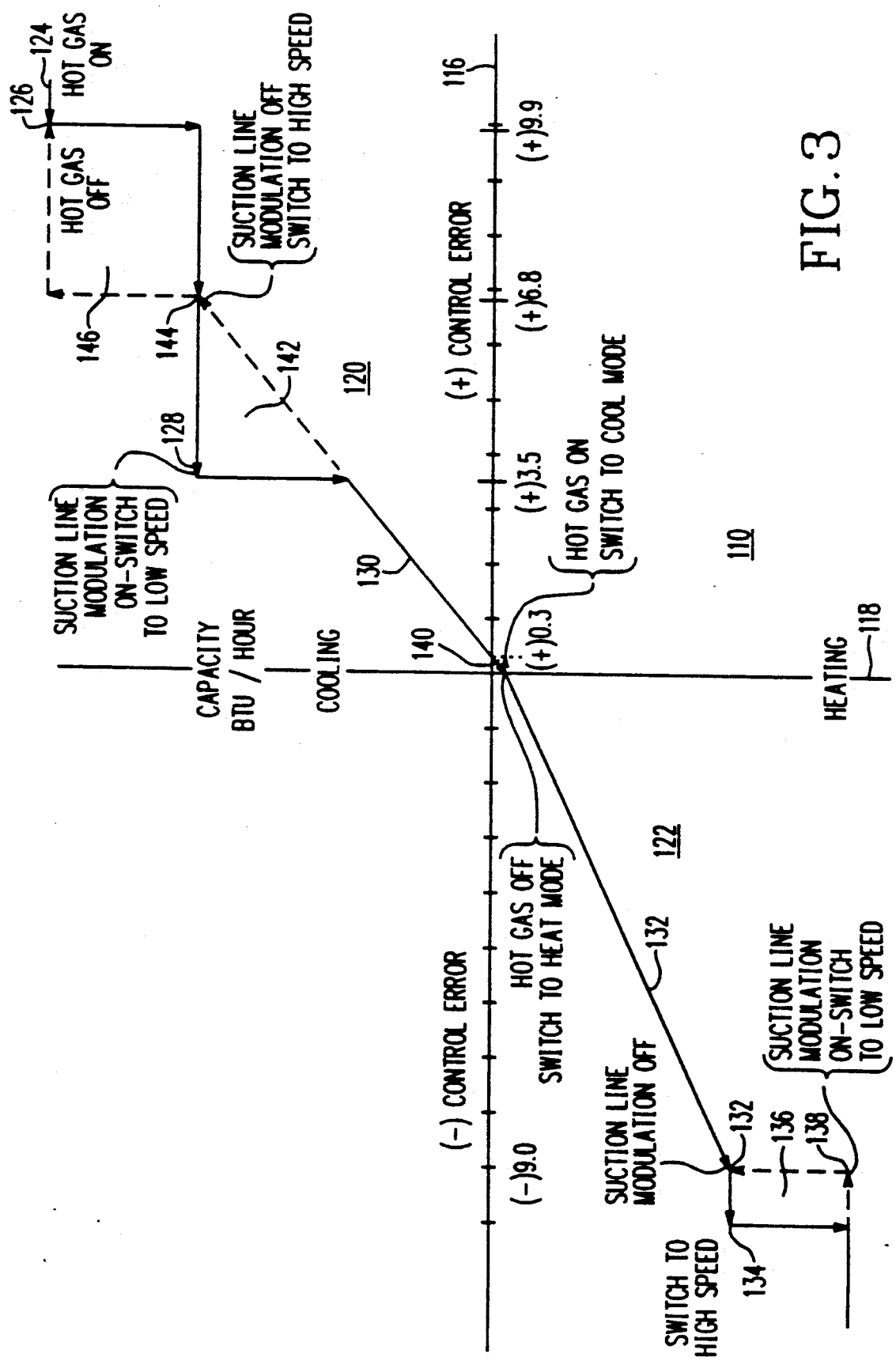
FIG. 3 is a diagram which illustrates heating and cooling capacity versus control error for a transport refrigeration system operated according to the method of the invention.

FIG. 3 is a diagram which illustrates the new control algorithm 110 in a different format, indicating refrigeration and heating capacity of refrigeration system 10 at the various exemplary control error values used in FIG. 2. More specifically, in FIG. 3, the control error values are disposed along a horizontal line or abscissa 116, and the cooling and heating capacities are illustrated along a vertical line or ordinate 118. Cooling capacity is indicated in an area 120 above the abscissa 116, and heating capacity is indicated in an area 122 below abscissa 110. Positive control error, i.e., the sign of the control error value when the control error exceeds the set point temperature, is in the area 120 to the right of ordinate 116, and negative control error, i.e., the sign of the control error value when the control error is less than the set point temperature, is in the area 122 to the left of ordinate 116.

Constant cooling capacity during high speed cool is indicated with horizontal line 124, with a step reduction in cooling capacity occurring at point 126, when hot gas injection is initiated at the exemplary control error value of +9.9. The cooling capacity then remains constant with a falling temperature in the served space 92 until reaching point 128, at the exemplary control error of +3.5, at which time the prime mover and compressor are switched to low speed, which causes another step reduction in cooling capacity. Suction line modulation also occurs at the exemplary control error of +3.5, with cooling capacity being gradually reduced along line 130.

Cooling capacity switches to heating capacity without a step function just prior to reaching 0 control error, enabling set point to be held without a mode change in most instances. If more heat is required to hold set point, a mode change from cooling to heating is made at zero control error, and since suction line modulation is still active, the initial heating capacity during the heat mode closely matches the heat capacity available just prior to switching modes, enabling the mode change to be made without loss of control.

If the temperature of the served space 92 continues to drop, the heating capacity increases gradually along line 130, with suction line modulation being terminated at point 132. If the control error continues to increase in a negative direction, a step change in heating capacity is provided at point 134 by switching prime mover 16 to high speed. Upon a rising temperature, a small amount of hysteresis is provided, indicated by rectangular area 136, switching back to low speed and suction line modulation at point 138. Line 132 is then followed upwardly as modulation valve 54 is progressively closed, and upon reaching zero control error a small amount of hysteresis is provided, indicated by triangular area 140, before switching from the heat mode to the cool mode, and before initiating hot gas injection. Modulation is continued by gradually opening valve 54 to increase cooling capacity along line 130.

A relatively larger amount of hysteresis is provided, indicated by triangular area 142, by maintaining suction line modulation and low speed operation to point 144, at which time suction line modulation is terminated and the prime mover 16 is switched to high speed. The switch to high speed is initiated at a lower control error value with a rising temperature in space 92, than with a falling temperature, as indicated by rectangular area 146. If the control error continues to rise, hot gas injection is terminated at point 126.

In summary, there has been disclosed a new method of operating a transport refrigeration system which reduces loss of moisture in a fresh load, without sacrificing uniformity of temperature pull down, and without resorting to costly speed change arrangements for maintaining a high volume of evaporator air flow during pull down. The method further reduces cycling between cooling and heating modes to hold the temperature of the served space 92 very close to the selected set point temperature, and when a mode change is required, the method enables the change to be accomplished without significant loss of control by the thermostat 84 and refrigeration control 74.

We claim:

1. A method of operating a transport refrigeration system having a compressor driven by a prime mover at a selected one of predetermined high and low speed values; hot gas, liquid and suction lines; a condenser; an evaporator; expansion means in the liquid line; a controllable modulation valve in the suction line; a controllable hot gas injection valve between the hot gas line and evaporator; evaporator air flow means driven by the prime mover, and control means providing a control error which controls the temperature of a load space to a predetermined set point via heating and cooling modes which includes modulation control of the suction line modulation valve, comprising the steps of:

driving the compressor at the predetermined high speed value during a cooling mode when the control error exceeds a first predetermined value, injecting hot gas into the evaporator via the hot gas injection valve when the control error is reduced to said first predetermined value, while maintaining the prime mover at the predetermined high speed, to maintain the evaporator air flow at a high rate associated with high prime mover speed, to provide relative rapid temperature pull-down across the entire load space, notwithstanding that cooling capacity has been reduced by the hot gas injection, reducing the speed of the prime mover to the predetermined low speed value when the control error has been further reduced to a second predetermined value, while initiating suction line modulation and maintaining hot gas injection, and switching from the cool mode to the heat mode, when the control error has been further reduced to a third predetermined value, while maintaining suction line modulation and terminating hot gas injection, said hot gas injection during a cool mode necessitating a small flow of refrigerant through the suction line at and near a control error value of zero, either enabling set point to be held without a mode change, or causing the refrigeration capacity just prior to a mode change to more closely match the capacity available after a mode change, enabling substantially continuous and more stable control over the load space temperature through a mode change.

2. The method of claim 1 including the step of terminating suction line modulation during the heat mode in the event the temperature of the load space continues to drop and the control error reaches a fourth predetermined value.

3. The method of claim 2 including the step of initiating suction line modulation, when the temperature of the load space rises during the heat mode and the control error is reduced to the fourth predetermined value.

4. The method of claim 2 including the step of increasing the prime mover speed to the predetermined high speed value, in the event the temperature of the load space continues to drop during the heat mode and the control error reaches a fifth predetermined value.

5. The method of claim 4 including the step of reducing the prime mover speed to the predetermined low speed value, and initiating suction line modulation, when the temperature of the load space rises during the heat mode and the control error is reduced to the fourth predetermined value.

6. The method of claim 1 including the step of switching from the heat mode to the cool mode when the control error rises to a predetermined hysteresis value above the third predetermined control error value, while maintaining suction line modulation and initiating hot gas injection.

7. The method of claim 6 including the step of increasing the prime mover speed to the predetermined high speed value in the event the control error continues to rise during the cool mode to a predetermined hysteresis value above the second predetermined value, while terminating suction line modulation and continuing hot gas injection.

8. The method of claim 7 including the step of terminating hot gas injection in the event the control error continues to rise during the cool mode and reaches the first predetermined control error value.

* * * * *